(12) United States Patent
Flohr et al.

(10) Patent No.: US 7,655,830 B2
(45) Date of Patent: Feb. 2, 2010

(54) SUPERABSORBENT POLYMER PARTICLES COMPRISING FUNCTIONALIZERS AND METHOD OF MAKING THEM

(75) Inventors: Andreas Flohr, Kronberg (DE); Torsten Lindner, Kronberg (DE)

(73) Assignee: The Procter & Gamble Co., Cincinnati, OH (US)

( * ) Notice: Subject to any disclaimer, the term of this patent is extended or adjusted under 35 U.S.C. 154(b) by 209 days.

(21) Appl. No.: 11/198,081

(22) Filed: Aug. 5, 2005

(65) Prior Publication Data

US 2006/0030829 A1 Feb. 9, 2006

(30) Foreign Application Priority Data

Aug. 7, 2004 (EP) .................................. 04018801

(51) Int. Cl.
*A61F 13/15* (2006.01)

(52) U.S. Cl. .................. 604/368; 604/359; 604/360; 604/361; 525/220; 525/54; 525/31; 526/316; 526/313; 526/318; 526/317; 526/321; 521/148; 521/150; 524/522; 428/317.9

(58) Field of Classification Search .............. 428/317.9; 604/368, 359–361; 525/220, 54, 31; 526/316, 526/313, 317, 319, 321; 521/148, 150; 524/522

See application file for complete search history.

(56) References Cited

U.S. PATENT DOCUMENTS

| | | | |
|---|---|---|---|
| 3,214,492 A | 10/1965 | Tocker | |
| 3,429,852 A | 2/1969 | Skoultchi | |
| 3,622,848 A | 11/1971 | Hendrix et al. | |
| 4,076,663 A | 2/1978 | Masuda et al. | |
| 4,304,895 A | 12/1981 | Loshaek | |
| 4,922,004 A | 5/1990 | Kohler et al. | |
| 5,137,537 A | 8/1992 | Herron et al. | |
| 5,147,345 A | 9/1992 | Young et al. | |
| 5,260,345 A | 11/1993 | Desmarais et al. | |
| 5,342,338 A | 8/1994 | Roe | |
| 5,387,207 A | 2/1995 | Dyer et al. | |
| 5,397,316 A | 3/1995 | Lavon et al. | |
| 5,625,222 A | 4/1997 | Yoneda et al. | |
| 5,705,182 A * | 1/1998 | Brown-Skrobot | 424/431 |
| 5,827,913 A * | 10/1998 | Baetzold et al. | 523/210 |
| 5,853,867 A * | 12/1998 | Harada et al. | 428/317.9 |
| 6,011,196 A * | 1/2000 | Wang et al. | 604/368 |
| 6,025,186 A * | 2/2000 | Kirk et al. | 435/262 |
| 6,043,311 A | 3/2000 | Houben et al. | |
| 6,229,062 B1 * | 5/2001 | Mandell et al. | 604/367 |
| 6,239,230 B1 * | 5/2001 | Eckert et al. | 525/329.9 |
| 6,391,451 B1 * | 5/2002 | Mitchell et al. | 428/402 |
| 6,713,660 B1 * | 3/2004 | Roe et al. | 604/361 |
| 7,166,356 B2 * | 1/2007 | Flohr | 428/403 |
| 7,182,336 B2 | 2/2007 | Berlin et al. | |
| 7,452,922 B2 | 11/2008 | Fuskushima et al. | |
| 2003/0004479 A1 * | 1/2003 | Ueda et al. | 604/359 |
| 2003/0164136 A1 * | 9/2003 | Klofta et al. | 116/206 |
| 2004/0127866 A1 * | 7/2004 | Odorzynski | 604/359 |
| 2005/0032936 A1 * | 2/2005 | Flohr | 523/205 |
| 2005/0203474 A1 * | 9/2005 | Flohr | 604/368 |
| 2005/0215966 A1 * | 9/2005 | Borgmann et al. | 604/368 |

FOREIGN PATENT DOCUMENTS

| | | |
|---|---|---|
| DE | 196 19 680 A | 11/1997 |
| DE | 102 21 202 A | 7/2003 |
| EP | 0 279 475 A2 | 8/1988 |
| EP | 0 377 191 A2 | 7/1990 |
| EP | 1506788 A1 * | 7/2005 |
| EP | 1624002 A | 2/2006 |
| EP | 1757646 A | 2/2007 |
| JP | 2003 156961 A | 5/2003 |
| WO | WO 96/15180 A | 5/1996 |
| WO | WO 99/55393 A | 11/1999 |

OTHER PUBLICATIONS

PCT Search Report, mailed Nov. 22, 2005, 3 pages.
International Search Report dated Jul. 30, 2008 (4 pages).

* cited by examiner

*Primary Examiner*—Tatyana Zalukaeva
*Assistant Examiner*—Ginger T Chapman
(74) *Attorney, Agent, or Firm*—John G. Powell; Eric T. Addington

(57) ABSTRACT

The present invention relates to superabsorbent polymer particles having functionalizers covalently bound to the surface of precursor superabsorbent polymer particles.

The functionalizers of the present invention comprise a grafting unit with a radiation activatable group and a functional unit covalently bound to the grafting unit. The grafting unit is bound to an aliphatic C—H group comprised at the surface of the precursor superabsorbent polymer particle. The functional unit comprises chemical structures which are not present in the precursor superabsorbent polymer particle. These functional units add an additional function to the precursor suberabsorbent polymer particle or modifying an existing function of the precursor superabsorbent polymer particle.

Moreover, the invention relates to a process for making these superabsorbent polymer particles.

10 Claims, No Drawings

SUPERABSORBENT POLYMER PARTICLES COMPRISING FUNCTIONALIZERS AND METHOD OF MAKING THEM

FIELD OF THE INVENTION

The present invention relates to superabsorbent polymer particles comprising functionalizers. The functionalizers add an additional function to the superabsorbent polymer particles or modify an existing function of the superabsorbent polymer particle. The functionalizers are covalently bound to the superabsorbent polymer particles.

The present invention further relates to a method of making such superabsorbent polymer particles.

BACKGROUND OF THE INVENTION

Superabsorbent polymers (SAPs) are well known in the art. They are commonly applied in absorbent articles, such as diapers, training pants, adult incontinence products and feminine care products to increase the absorbent capacity of such products while reducing their overall bulk. The SAPs generally are capable of absorbing and retaining amounts of aqueous fluids equivalent to many times their own weight.

Commercial production of SAPs began in Japan in 1978. The early superabsorbent was a cross-linked starch-g-polyacrylate. Partially neutralized polyacrylic acid eventually replaced earlier superabsorbents in the commercial production of SAPs, and is the primary polymer employed for SAPs today. SAPs are often applied in form of small particles, such as fibers or granules. They generally consist of a partially neutralized lightly crosslinked polymer network, which is hydrophilic and permits swelling of the network once submerged in water or an aqueous solution such as physiological saline. The cross-links between the polymer chains assure that the SAP does not dissolve in water.

It is well known in the art to coat the surface of the SAP particle in order to add further functionality: Silica or aluminum sulphate can be applied as well as waxes, polymers or inorganic water-insoluble salts. The coating can be done in a separate process step after the surface cross-linking, or the coating substance can be applied together with the surface cross-linking solutions.

In the case of aluminum sulphate, ionic bonds with the carboxylate ions of the SAP particle are formed, but those bonds are ruptured in the presence of body fluids due to solvation effects. In the case of most waxes and polymers, predominantly weak and reversible van-der-Waals forces provide the attachment to the surface.

In all cases, however, the coatings are merely reversibly attached to the surface of the SAP particles and no irreversible covalent bonds are created between the coating and the SAP particles. Therefore, such coatings tend to be relatively unstable: They may be washed off easily upon contact with liquid or the coating may be eliminated partly or completely during conveying of the SAP particles (e.g. during manufacture or transportation of an absorbent article comprising the SAP particles) by a mechanical means such as abrasion.

If the SAP particles are applied in absorbent articles, the surface properties of the SAP particles are negatively altered after wash off of the coating upon contact with body fluids during use of the absorbent article. Furthermore, the overall performance of the absorbent article may be negatively affected by the coatings dissolved in the body fluids For example, the surface tension of the body fluids may be reduced due to the presence of the washed off coating. This, in turn, may decrease the capillary pressure of the body fluids and as a result, the porous absorbing and/or desorbing materials in the absorbent article may partly or completely lose their wicking properties.

Or, a colored pigment comprised by the coating, which gets dissolved in the body fluids, may negatively affect the aesthetic appearance of the absorbent article or the color may irritate the wearer/caretaker.

Especially, if the coating is done with waxes, the surface properties of the SAP particles, such as permeability for liquids, may be negatively affected, depending e.g. on the thickness of the wax coating.

Another drawback with coatings is that they may diffuse inside the SAP particle during the coating process, depending e.g. on the duration of the coating process.

Also known in the art are absorbent gelling particles comprising a water-insoluble, absorbent, hydrogel-forming polymer and a polycationic polymer, wherein the polycationic polymer is covalently bound to the absorbent gelling particles. The covalent bonds are created via carboxyl groups comprised especially at the surface of said absorbent gelling particles. However, often a relatively large portion of the carboxyl groups of the absorbent gelling material is neutralized prior to the polymerization step, and hence, commonly relatively few carboxyl groups are available for the covalent bond between the absorbent gelling particles and the polycationic polymer. Consequently, the degree of neutralization has to be balanced with the need to covalently bond the polycationic polymer to the absorbent gelling particles, because both process steps make use of the carboxyl groups.

To overcome the problems set out above, it is an objective of the present invention to provide SAP particles with added or modified functionalities, wherein the functionalities are added or modified permanently. The functionality shall not get lost due to wash off upon contact of the SAP particles with liquid. Moreover, the functionality shall also be provided durably in that it does not get lost upon conveying and transport of the SAP particles and during manufacture, e.g. of absorbent articles comprising such SAP particles.

Furthermore, the functionality shall be provided without the need to compromise on the degree of neutralization of the SAP particles.

It is a further objective of the present invention, to provide a method to produce such SAP particles with added or modified functionality.

SUMMARY OF THE INVENTION

The present invention relates to superabsorbent polymer particle comprising
a precursor superabsorbent polymer particle consisting of cross-linked poly(meth)acrylic acid and salts thereof, the precursor superabsorbent polymer particle comprising aliphatic C—H groups, and the precursor superabsorbent polymer particle having a surface and a core, and
functionalizers covalently bound to the surface of the precursor superabsorbent polymer particle,
the functionalizers each comprising a functional unit and a grafting unit,
the functional unit being covalently bound to the grafting unit,
the functional unit having a molecular weight of up to 1000 and comprising chemical structures which are not present in the precursor superabsorbent polymer particle, the functional units adding an additional function to the precursor suberabsorbent polymer particle or modifying an existing function of the precursor superabsorbent polymer particle, the grafting unit of the functionalizer being bound through one covalent bond to one of said aliphatic C—H groups comprised in the precursor superabsorbent polymer particle.

The present invention relates further to a method of making superabsorbent polymer particles having functionalizers which comprises the steps of a) providing precursor superabsorbent polymer particles consisting of cross-linked poly(meth)acrylic acid and salts thereof, the precursor superabsorbent polymer particles comprising aliphatic C—H groups and the precursor superabsorbent polymer particles having a surface and a core, b) adding functionalizers, each functionalizer comprising a functional unit and a grafting unit, the grafting unit comprising one radiation activatable group and the grafting unit being covalently bound to the functional unit, the functional unit having a molecular weight of up to 1000 and comprising chemical structures which are not present in the precursor superabsorbent polymer particle, the functional units adding an additional function to the precursor suberabsorbent polymer particle or modifying an existing function of the precursor superabsorbent polymer particle, c) exposing the precursor superabsorbent polymer particles and the functionalizers to electromagnetic irradiation capable of activating the radiation activatable group, whereby the radiation activatable group of the grafting unit is covalently bound to the surface of the precursor superabsorbent polymer particles, the grafting unit being covalently bound to one of said aliphatic C—H groups comprised in the precursor superabsorbent polymer particles by a radical reaction.

DETAILED DESCRIPTION OF THE INVENTION

The SAPs according to the present invention comprise cross-linked poly(meth)acrylic acid and salts thereof, i.e. the polymer has been polymerized from the $\alpha,\beta$-unsaturated carboxylic acid monomers acrylic acid monomers and/or methacrylic acid monomers.

Preferably, SAPs comprise partially neutralized, slightly network crosslinked, polyacrylic acid (i.e. poly (sodium acrylate/acrylic acid)). Preferably, the SAPs are at least 50%, more preferably at least 70%, even more preferably at least 75% and even more preferably from 75% to 95% neutralized. Network cross-linking renders the polymer substantially water-insoluble and, in part, determines the absorptive capacity of the hydrogelforming absorbent polymers. Processes for network cross-linking these polymers and typical network cross-linking agents are described in greater detail in U.S. Pat. No. 4,076,663.

A suitable method for polymerizing the $\alpha,\beta$-unsaturated carboxylic acid monomers is aqueous solution polymerization, which is well known in the art. An aqueous solution comprising $\alpha,\beta$-unsaturated carboxylic acid monomers and polymerization initiator is subjected to a polymerization reaction. The aqueous solution may also comprise further monomers, which are co-polymerizable with the $\alpha,\beta$-unsaturated carboxylic acid monomers. At least the $\alpha,\beta$-unsaturated carboxylic acid has to be partially neutralized, either prior to polymerization of the monomers, during polymerization or post polymerization. In a preferred embodiment of the present invention, the monomers are at least 50%, more preferably at least 70%, even more preferably at least 75% and even more preferably from 75% to 95% neutralized.

The monomers in aqueous solution are polymerized by standard free radical techniques, commonly by using a photoinitiator for activation, such as ultraviolet (UV) light. Alternatively, a redox initiator may be used. In this case, however, increased temperatures are necessary.

The water-absorbent resin will preferably be lightly cross-linked to render it waterinsoluble. The desired cross-linked structure may be obtained by the co-polymerization of the selected water-soluble monomer and a cross-linking agent possessing at least two polymerizable double bonds in the molecular unit. The cross-linking agent is present in an amount effective to cross-link the water-soluble polymer. The preferred amount of cross-linking agent is determined by the desired degree of absorption capacity and the desired strength to retain the absorbed fluid, that is, the desired absorption under load. Typically, the cross-linking agent is used in amounts ranging from 0.0005 to 5 parts by weight per 100 parts by weight of monomers used. If an amount over 5 parts by weight of cross-linking agent per 100 parts is used, the resulting polymer has a too high crosslinking density and exhibits reduced absorption capacity and increased strength to retain the absorbed fluid. If the cross-linking agent is used in an amount less than 0.0005 parts by weight per 100 parts, the polymer has a too low cross-linking density and when contacted with the fluid to be absorbed becomes rather sticky, water-soluble and exhibits a low absorption performance, particularly under load. The cross-linking agent will typically be soluble in the aqueous solution.

Alternatively to, or in addition to, co-polymerizing the cross-linking agent with the monomers, it is also possible to cross-link the polymer chains in a separate process step after polymerization.

After polymerization, cross-linking and partial neutralization, the viscous SAPs are dehydrated (i.e. dried) to obtain dry SAPs. The dehydration step can be performed by heating the viscous SAPs to a temperature of about 120° C. for about 1 or 2 hours in a forcedair oven or by heating the viscous SAPs overnight at a temperature of about 60° C. The content of residual water in the dehydrated SAP after drying predominantly depends on drying time and temperature and can range from 0.5% by weight of dry SAP up to 50% by weight of dry SAP. Preferably, the content of residual water in the dehydrated SAP after drying is 0.5%-45% by weight of dry SAP, more preferably 0.5%-30%, even more preferred 0.5%-15% and most preferred 0.5%-5%.

The SAPs can be transformed into particles of numerous shapes. The term "particles" refers to granules, fibers, flakes, spheres, powders, platelets and other shapes and forms known to persons skilled in the art of SAPs. E.g. the particles can be in the form of granules or beads, having a particle size of about 10 to 1000 µm, preferably about 100 to 1000 µm. In another embodiment, the SAPs can be in the shape of fibers, i.e. elongated, acicular SAP particles. In those embodiments, the SAP fibers have a minor dimension (i.e. diameter of the fiber) of less than about 1 mm, usually less than about 500 µm, and preferably less than 250 µm down to 50 µm. The length of the fibers is preferably about 3 mm to about 100 mm. The fibers can also be in the form of a long filament that can be woven.

The dehydrated SAP particles typically undergo a surface cross-linking process step to reduce "gel-blocking":

After absorption of an aqueous solution, swollen SAP particles become very soft and deform easily. Upon deformation the void spaces between the SAP particles are blocked, which drastically increases the flow resistance for liquids. This is generally referred to as "gel-blocking". In gel blocking situations liquid can move through the swollen SAP particles only by diffusion, which is much slower than flow in the interstices between the SAP particles.

One commonly applied way to reduce gel blocking is to make the particles stiffer, which enables the SAP particles to retain their original shape thus creating or maintaining void spaces between the particles. A well-known method to increase stiffness is to cross-link the carboxyl groups exposed on the surface of the SAP particles. This method is commonly referred to as surface cross-linking.

Commonly applied surface cross-linkers are thermally activatable surface cross-linkers. The term "thermally activatable surface cross-linkers" refers to surface cross-linkers, which only react upon exposure to increased temperatures, typically around 150° C. Thermally activatable surface cross-linkers known in the prior art are e.g. di- or polyfinctional agents that are capable of building additional cross-links between the polymer chains of the SAPs. Examples of thermally activatable surface cross-linkers include but are not limited to: di- or polyhydric alcohols, or derivatives thereof, capable of forming di- or polyhydric alcohols, alkylene carbonates, ketales, and di- or polyglycidlyethers, haloepoxy compounds, polyaldehydes, polyoles and polyamines. The cross-linking is based on a reaction between the functional groups comprised by the polymer, for example, an esterification reaction between a carboxyl group (comprised by the polymer) and a hydroxyl group (comprised by the surface cross-linker). As typically a relatively large fraction of the carboxyl groups of the polymer chain is neutralized prior to the polymerization step, commonly only few carboxyl groups are available for this surface crosslinking process known in the art. E.g. in a 70% percent neutralized polymer only 3 out of 10 carboxylic groups are available for covalent surface cross-linking.

The term "surface" describes the outer-facing boundaries of the particle. For porous SAP particles, exposed internal surfaces may also belong to the surface. The term "surface cross-linked SAP particle" refers to an SAP particle having its molecular chains present in the vicinity of the particle surface cross-linked by a compound referred to as surface cross-linker. The surface cross-linker is applied to the surface of the particle. In a surface cross-linked SAP particle the level of cross-links in the vicinity of the surface of the SAP particle is generally higher than the level of cross-links in the interior of the SAP.

SAP particles consisting of cross-linked poly(meth)acrylic acid and salts thereof are generally colorless, odorless and translucent hydrogels. The stiffness of such particles depends mainly on the amount of cross-links, while the capacity mainly depends on the neutralization degree. In order to add features, such as color or odor, or to modify existing functionalities, such as stiffness, the precursor SAP particles have to undergo a posttreatment.

The precursor SAP particles of the present invention consist of cross-linked poly(meth)acrylic acid and salts thereof. The precursor SAP particles comprise aliphatic C—H groups. Further, the precursor SAP particles have a surface and a core.

The term "aliphatic C—H group" stands for a C—H moiety belonging to an aliphatic unit comprised by the precursor super absorbent polymer particle. The aliphatic unit may be e.g. the repeat unit of poly(meth)acrylic acid. The aliphatic C—H group is comprised by a methine-, a methylene- or a methyl-group, preferably a methylene- or a methyl-group.

According to the present invention, functionalizers are covalently bound to precursor SAP particles. Each functionalizer molecule comprises one functional unit and one grafting unit, the functional unit being covalently bound to the grafting unit. The precursor SAP particles consist of cross-linked poly(meth)acrylic acid and salts thereof, i.e. they are partially neutralized.

The functional unit and the grafting unit are covalently bound to each other and hence, one functional unit and one grafting unit together form one functionalizer molecule. The functionalizer molecule in turn, is covalently bound to only one aliphatic C—H group comprised in the precursor SAP particle in a radical reaction. The functionalizer is bound to the precursor SAP particle though its grafting unit.

The grafting unit comprises one radiation activatable group. Hence, the grafting unit, covalently bound to the functional unit, is radiation activatable and further is monofunctional in that it comprises only one radiation activatable group. Upon irradiation of this radiation activatable group, the latter is transferred into a reactive excited state (triplet) capable of abstracting hydrogen atoms from aliphatic C—H groups, whereby ultimately the grafting unit gets covalently bound to the precursor SAP particle via a radical reaction. As the grafting unit comprises only one radiation activatable group, only one covalent bond between the grafting unit and the precursor SAP particle is formed per functionalizer.

Radiation activatable compounds as such and their synthesis are know in the art, e.g. from European Patent Application EP-A-0 377 191; U.S. Pat. No. 3,214,492; U.S. Pat. No. 3,429,852; U.S. Pat. No. 3,622,848; U.S. Pat. No. 4,304,895; German Patent Application DE-A-3534645 and European Patent Application EP-A-279 475.

The grafting unit is preferably selected from the group consisting of acetophenone, benzophenone, anthraquinone, xanthone, thioxanthone, camphorquinone, terephthalophenone, benzil, fluorenone, α-ketocoumarin as well as acetophenone-, benzophenone-, anthraquinone-, xanthone-, thioxanthone-, camphorquinone-, terephthalophenone-, benzil-, fluorenone-, α-ketocoumarin-derivatives. Suitable acetophenone derivatives or benzophenone derivatives, for example, also comprise reaction products, such as condensation products, of acetophenone derivatives or benzophenone derivatives, comprising at least two acetophenone or benzophenone groups. In a preferred embodiment of the invention, such derivatized grafting units are used to enable or further enhance water-solubility.

Alternatively, the grafting unit may comprise a first group selected from the group consisting of methyl, benzyl, aryl, preferably phenyl and substituted phenyl, and a second group selected from the group consisting of an aryl, an alkyl of 1 to 4 carbon atoms, cyclopropyl, cyclopentyl, cyclohexyl, α,α-dialkoxyalkyl, and α-hydroxyalkyl and wherein the first group is covalently bound to the second group via an additional carbonyl group.

The radiation activatable group preferably comprises a carbonyl group.

The functional unit has a molecular weight of up to 1000 and preferably comprises at least one heteroatom.

The functional units comprise chemical structures, which are not present in the precursor SAP particle. The chemical structure being "comprised" in the functional unit means, that the functional group may comprise further atoms, or, alternatively, may mean that the functional unit consists only of this chemical structure.

The functional units add an additional function to the precursor SAP particle or modify an existing function of the SAP particle. The function provided to the SAP particle by the functional unit may be hydrophilicity, hydrophobicity, color (in embodiments, wherein the functional unit comprises a pigment), or improved ion exchange capability (in embodiments wherein the functional is a cationic or anionic ion exchanger).

Alternatively, the functional unit may also provide the SAP particle with an antibacterial and/or a fungicide function or with a malodor-absorbing function.

Still further, the function provided to the SAP particle by the functional unit may be the ability to release certain ingredients upon contact of the functional unit with liquid, upon increasing the temperature of the functional unit or by exerting pressure on the functional unit.

Also, the functional unit may provide a wetness indicator function to the SAP particle by selecting the functional unit to change its color as a function of the pH value. Or, alternatively, the functional unit may provide a temperature balancing function or a cooling function to the SAP particles.

Moreover, the functional unit may add the function of permanent tackiness to the SAP particle.

All these and functions provided by the functional unit are described in detail below.

The functional units may be selected in a way that the SAP particle is rendered permanently hydrophilic. In these embodiments, the chemical structures, comprised in the functional units and not present in the precursor SAP particles, may comprise positively or negatively charged groups or non-charged groups with a high polarity. Examples of such chemical groups are: carboxylate anions, carboxylic acids or carboxylic acid derivatives, sulfonate anions, sulfonic acids or sulfonic acid derivatives, phosphonate anions, phosphonic acids or phosphonic acid derivates, further quaternary ammonium cations, polyglycole esters, or oxyethanole residues. Preferably, also quarternary fatty acid derivatives, fatty acid polyglycole esters, neutralized phosphate esters, ethoxylated fatty acid esters, sodium lauryl glutamate, stearic acid ethoxylate, alkylphosphate amine salts, polyether modified silicones, or alkyloxy polyethyleneoxyethanol can be comprised as chemical structures in the functional units to provide hydrophilicity to the SAP particle.

Alternatively, the functional units may provide hydrophobicity to the SAP particles. In these embodiments, the functional units comprise chemical structures not present in the precursor SAP particle, the chemical structures preferably being fluorinated residues, silicones, siloxanes or hydrocarbons without hetero-atoms.

As another alternative, the functional unit may comprise a pigment as chemical structure not present in the precursor SAP particle. The pigment provides a desired color to the SAP particles. An example of a suitable pigment for the present invention is a derivative of Pigment blue 15 (CAS 147-14-8). Pigment blue 15 is depicted in Formula 1. Formula 2 shows a surface functionalizer according to the present invention comprising a derivative of Pigment blue 15 as functional unit, covalently bound to the grafting unit "G".

Formula 1:

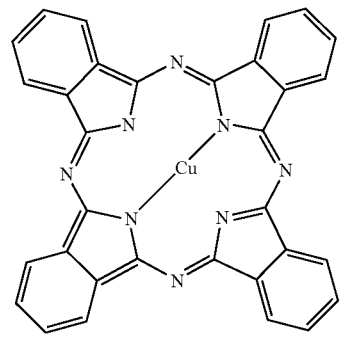

Formula 2:

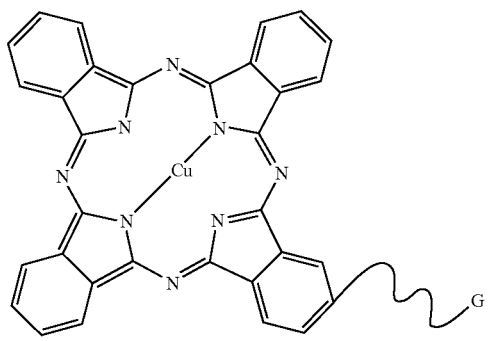

The functional unit may also provide the SAP particle with an antibacterial, a fungicide or another biocide function. In these embodiments, the functional units comprise chemical structures not present in the precursor SAP particle, the chemical structures being for example: a derivative of methylparabene (CAS 99-76-3), or a derivative of ethylparabene (CAS 120-47-8), both providing antimicrobial properties. Formula 3 depicts methylparabene and Formula 4 depicts a functionalizer according to the present invention comprising a derivative of methylparabene as functional unit, covalently bound to the grafting unit "G".

Formula 3:

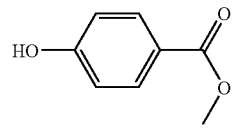

Formula 4:

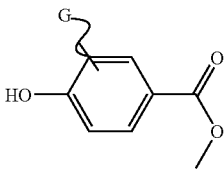

In a still further embodiment of the present invention, the functional units provide malodor-absorbing properties to the SAP particles. The malodor may for example be generated by body liquids but may also be inherent to other materials used in an absorbent article, like adhesives or films. In these embodiments, the functional units comprise chemical structures not present in the precursor SAP particle, the chemical structures for example being cyclodextrines or derivatives thereof.

Alternatively, the functional units may be selected in a way that an ingredient is released when pressure is exerted on the functional unit or upon contact with liquids, such as body liquids (e.g. urine) in case the SAP particles are incorporated in an absorbent article. Furthermore, the ingredient may be released when the temperature of the functional unit is increased above a certain level, preferably above 30° C., more preferably above 34° C. and even more preferably more than 37° C. The ingredient to be released may for example be a perfume that provides malodor masking properties. In these embodiments, the chemical structures, which are comprised by the functional unit and which are not present in the precursor SAP particles, are chemical structures which enclose the ingredient(s). Examples of such chemical structures are starches or other appropriate polymer baskets. In these embodiments, the ingredients are not part of the functionalizer, i.e. they are not covalently bound to the functionalizer. Contrary thereto, the chemical structures enclosing the ingredients are part of the functional unit.

Typical ingredients to be released are Geraniol (CAS 106-24-1), as depicted in Formula 5, or Eugenol (CAS 97-53-0), as depicted in Formula 6, both of which can be used as perfumes for odor control.

Formula 5:

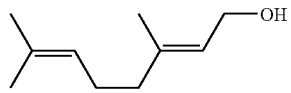

Formula 6:

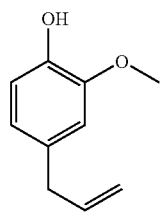

In a further alternative embodiment of the present invention, the functional units may be selected in a way that they change their color as a function of the pH value, thus adding the function of a wetness indicator to the SAP particles. In these embodiments, the chemical structures, comprised by the functional units not being present in the precursor SAP particles, are pH indicators, preferably changing color in a pH range between 3 and 5. Typically, bromocresol green or bromophenol blue derivatives may be applied as chemical structures.

Alternatively, the chemical structures comprised by the functional units may be selected from the group of ion exchangers. In these embodiments, the chemical structures being ion exchangers are not present in the precursor SAP particles and enhance the ion exchange capacity of the SAP particle.

In a further alternative embodiment of the present invention, the functional units are selected in a way that they provide a temperature balancing function, respectively a cooling effect. In these embodiments, the chemical structures, comprised by the functional units not being present in the precursor SAP particles, are paraffin waxes. For use in the present invention, the wax should have a sharp melting point, typically within the range of 25° C. (wearing temperature at the back of a diaper) and 37° C. (temperature of urine). Such waxes are solid at wearing conditions of the absorbent article but will melt upon contact with body liquid at body temperature. Upon melting, the waxes reversibly extract heat from the environment which is then stored as latent heat whereby the ambient temperature is kept constant at the melting temperature of the wax, resulting in a cooling effect.

Furthermore, the functional units may be selected such that they render the SAP particles permanently tacky. Examples for such chemical structures are resins typically applied in hot melt adhesives, e.g. rosin ester derivatives or short chain polyolefins (Pn up to 50) comprising double bonds. Permanently tacky SAP particles can be used in absorbent articles for wet and dry immobilization of the SAP particles within the absorbent core without the need for adhesives to immobilize them.

Process

Above-mentioned functionalizers are capable of forming covalent bonds by exposure to electromagnetic irradiation due to their grafting unit comprising a radiation activatable group. Electron beams as well as UV-light can produce suitable electromagnetic irradiation. Preferably, according to the present invention UV-light is used with a wave-length of 220-380 nm, depending on the selected functionalizer. The UV-light may be used in combination with an electron-beam, and also in combination with IR-light. In case of combination of UV-irradiation with other electromagnetic irradiation, it is not critical if the application of the UV-light takes place simultaneously with the other electromagnetic irradiation (i.e. electron-beam or IR-light), or if irradiation is done in a series of different irradiation steps. For functionalizers, wherein the radiation activatable group of the grafting unit requires a relatively high activation energy, activation with electron beams may be necessary.

In the present invention the functionalizers are applied in amounts of less than 50% by weight of the precursor SAP particles, preferably in amounts of less than 25%, more preferably in amounts of less than 15%, even more preferably in amounts of less than 5% and most preferably in amounts from 0.1% to 5%.

The functionalizers may be sprayed onto the precursor SAP particles by means of a fluidized-bed spraying chamber. Simultaneously IR-irradiation may be applied to accomplish drying and simultaneously UV-light may be applied to accomplish the radical reaction in the fluidized-bed.

However, in certain cases the drying and the radical reaction may take place in two steps in series, which could be carried out in any order. Instead or in combination with IR-light, any conventional drying equipment can be used in the drying step. However, in certain embodiments of the present invention little or no drying is required, e.g. in cases, where only small amounts of functionalizers are applied dissolved in small amounts of solvent.

The radical reaction between the precursor SAP particles and the functionalizer according to the present invention effectively takes place at the radiation activatable group of the grafting unit comprised by the functionalizer, forming a covalent bond with the precursor SAP particle. On exposure to electromagnetic irradiation, most preferably UVirradiation, a covalent bond is formed by means of the chemical grafting reaction.

Without wanting to be bound by theory, it is believed that the carbonyl group comprised by the radiation activatable group of the grafting unit, may—upon irradiation—be excited into an activated triplet state, capable of abstracting a hydrogen atom from an aliphatic C—H group comprised by the precursor superabsorbent polymer particle. As a result of the hydrogen abstraction reaction, the activated carbonyl group may be transferred into a ketyl radical and the aliphatic C—H group is transferred into a carbon centered radical.

Upon combination of the ketyl radical and the carbon centered radical the new covalent bond between grafting unit and precursor superabsorbent polymer particle may be formed. Hence, the carbonyl group comprised by the grafting unit is reduced in the course of the reaction, i.e. is transferred into a hydroxyl group after the completion of the grafting reaction (photoreduction).

Theoretically, the reactive group of the grafting unit may upon irradiation also react with carboxyl groups comprised by the precursor superabsorbent polymer particle. However, it is much more likely that the reactive intermediates will react with the nearly unpolarized aliphatic C—H groups. It is rather unlikely that said reactive intermediates will be able to abstract a hydrogen radical from the carboxyl group, which is strongly polarized.

As a result of the above described reaction at least a part of the functionalizers are covalently bound to the aliphatic groups comprised by the polymer chains of the precursor SAP particles. The functionalizers will mainly be bound to those aliphatic C—H bond, which are at least partially exposed on the surface of the precursor SAP particles. As the radical reaction of the present invention is not restricted to the carboxyl groups but predominantly takes place at the numerous aliphatic C—H groups of the precursor SAP particles, the number of available reaction sites is strongly increased compared to reactions known from the prior art, which are restricted to the carboxyl groups of the SAP particles. Therefore, it is possible to achieve a homogenous, uniform distribution of functionalizers covalently bound to the surface of the SAP particles.

The described radical reaction according to the method of the present invention results in a further advantage related to neutralization of SAP particles: The $\alpha,\beta$-unsaturated carboxylic acid monomers are often neutralized prior to the polymerization step (preneutralization). Sometimes neutralization is carried out after polymerization (postneutralization). Compounds, which are useful to neutralize the acid groups of the monomers, are typically those, which will sufficiently neutralize the acid groups without having a detrimental effect on the polymerization process. Such compounds include alkali metal hydroxides, alkali metal carbonates and bicarbonates. Preferably, the material used for neutralization of the monomers is sodium or potassium hydroxide or carbonate. The neutralizing compound is preferably added to an aqueous solution comprising the $\alpha,\beta$-unsaturated carboxylic acid monomers (pre-neutralization). As a result, the carboxyl groups comprised by the $\alpha,\beta$-unsaturated carboxylic acid monomers are at least partially neutralized. Consequently,—after the polymerization step—also the carboxyl groups comprised by the $\alpha,\beta$-unsaturated carboxylic acid of the polymer are at least partially neutralized. Also for post-neutralization the carboxyl groups comprised by the $\alpha,\beta$-unsaturated carboxylic acid of the polymer are at least partially neutralized. In case sodium hydroxide is used, neutralization results in sodium acrylate, which dissociates in water into negatively charged acylate monomers and positively charged sodium ions.

If the final SAP particles are in the swollen state, after they absorbed aqueous solution, the sodium ions are freely movable within the SAP particles. In absorbent articles, such as diapers or training pants, the SAP particles typically absorb urine. Compared to distilled water, urine comprises a relatively high amount of salt, which at least partly is present in dissociated form. The dissociated salts comprised by the urine make absorption of liquid into the SAP particles more difficult, as the liquid has to be absorbed against an osmotic pressure caused by the ions of the dissociated salts. The freely movable sodium ions within the SAP particles strongly facilitate the absorption of liquid into the particles, because they reduce the osmotic pressure. Therefore, a high degree of neutralization can largely increase the capacity of the SAP particles and the speed of liquid absorption.

Methods to modify the surface properties of SAP particles known in the art, if comprising a covalent bond between the SAP particle and the molecules modifying the surface properties, require that the covalent bond is present between the carboxyl groups of the SAP particles and the modifying molecule. Hence, the degree of neutralization has to be balanced with the need to surface cross-link, because both process steps make use of the carboxyl groups.

According to the present invention, the grafting unit of the functionalizer comprises radiation activatable groups and—once activated e.g. by UV irradiation—it is able to react with the aliphatic C—H groups comprised by the polymer. Therefore, high neutralization levels of the SAP particles are possible without significantly diminishing the number of covalent bonds of the functionalizers to the SAP particles.

According to the present invention, the carboxyl groups comprised by the $\alpha,\beta$-unsaturated carboxylic acid monomers are preferably at least 50%, more preferably at least 70%, even more preferably at least 75% and even more preferably between 75% and 95% neutralized. Hence, also the carboxyl groups comprised by the $\alpha,\beta$-unsaturated carboxylic acid of the polymer are at least 50%, more preferably at least 70%, even more preferably at least 75% and even more preferably between 75% and 95% neutralized.

The UV irradiation can preferably be carried out in a conventional manner with UV lamps having a power between 50 W and 2 kW, more preferably between 200 W and 700 W, and even more preferred between 400 W and 600 W. Irradiation time is preferably between 0.1 sec. and 30 min., more preferably between 0.1 sec. and 15 min, even more preferably between 0.1 sec. and 5 min and most preferably between 0.1 sec. and 2 min.

Commercially available mercury pressure UV-lamps can be used. The choice of the lamp depends on the absorption spectrum of the functionalizer molecules used. The distance between the UV-lamp(s) and the SAP which is to be cross-linked preferably varies between 5 cm and 15 cm.

Compared to surface coating processes for SAP particles known from the prior art, the method according to the present invention is much quicker. Prior art coating processes commonly take up to 20 minutes. This time consuming process step renders the manufacturing process of SAP particles less economic than desired. On the contrary, the method according to the present invention can be carried out very quickly and hence, strongly adds to a much more efficient and economic overall manufacturing process.

Furthermore, as the radical reaction according to the method of the present invention proceeds quickly, the functionalizers applied on the surface of the precursor SAP particles have less time to penetrate inside the SAP particles. As a result, the radical reaction is in fact restricted to the surface of the SAP particles and avoids waste of material or even undesired side reactions inside the SAP particles.

The radical reaction according to the method of the present invention does not necessarily need increased temperatures but can also be carried out at moderate temperatures using electromagnetic irradiation, such as UV irradiation. According to the present invention, the radical reaction can preferably be accomplished at temperatures of less than 100° C., preferably at temperatures less than 80° C., more preferably at temperatures less than 50° C., even more preferably at temperatures less than 40° C., most preferably at temperatures between 20° C. and 40° C. In an additional process step drying of the SAP is typically carried out at temperatures above 100° C.

According to the present invention, one functionalizer can be selected or, alternatively, two or more different functionalizers, can be applied. The functionalizers may differ from each other with respect to their grafting unit, their functional unit, or both.

The functionalizer is preferably used in a liquid solution, more preferably in an aqueous solution.

To obtain SAP particles with homogeneous surface properties, the functionalizers have to be distributed evenly on the precursor SAP particle prior to or during UV irradiation.

Therefore, the functionalizers are preferably applied by spraying onto the precursor SAP particles.

Absorbent Articles

The SAP particles of the present invention are preferably applied in absorbent cores of absorbent articles. As used herein, absorbent article refers to devices that absorb and contain liquid, and more specifically, refers to devices that are placed against or in proximity to the body of the wearer to absorb and contain the various exudates discharged from the body. Absorbent articles include but are not limited to diapers, adult incontinent briefs, diaper holders and liners, sanitary napkins and the like.

Preferred absorbent articles of the present invention are diapers. As used herein, "diaper" refers to an absorbent article generally worn by infants and incontinent persons about the lower torso.

Absorbent articles especially suitable for the present invention typically comprise an outer covering including a liquid pervious topsheet, a liquid impervious backsheet and an absorbent core generally disposed between the topsheet and the backsheet. The absorbent core may comprise any absorbent material that is generally compressible, conformable, non-irritating to the wearer's skin, and capable of absorbing and retaining liquids such as urine and other certain body exudates. In addition to the SAP particles of the present invention, the absorbent core may comprise a wide variety of liquid-absorbent materials commonly used in disposable diapers and other absorbent articles such as comminuted wood pulp, which is generally referred to as air felt.

Exemplary absorbent structures for use as the absorbent assemblies are described in U.S. Pat. No. 5,137,537 entitled "Absorbent Structure Containing Individualized, Polycarboxylic Acid Crosslinked Wood Pulp Cellulose Fibers" which issued to Herron et al. on Aug. 11, 1992; U.S. Pat. No. 5,147,345 entitled "High Efficiency Absorbent Articles For Incontinence Management" issued to Young et al. on Sep. 15, 1992; U.S. Pat. No. 5,342,338 entitled "Disposable Absorbent Article For Low-Viscosity Fecal Material" issued to Roe on Aug. 30, 1994; U.S. Pat. No. 5,260,345 entitled "Absorbent Foam Materials For Aqueous Body Fluids and Absorbent Articles Containing Such Materials" issued to DesMarais et al. on Nov. 9, 1993; U.S. Pat. No. 5,387,207 entitled "Thin-Until-Wet Absorbent Foam Materials For Aqueous Body Fluids And Process For Making Same" issued to Dyer et al. on Feb. 7, 1995; U.S. Pat. No. 5,397,316 entitled "Slitted Absorbent Members For Aqueous Body Fluids Formed Of Expandable Absorbent Materials" issued to LaVon et al. on Mar. 14, 1995; and U.S. Pat. No. 5,625,222 entitled "Absorbent Foam Materials For Aqueous Fluids Made From high Internal Phase Emulsions Having Very High Water-To-Oil Ratios" issued to DesMarais et al. on Jul. 22, 1997.

All documents cited in the Detailed Description of the invention are, in relevant part, incorporated herein by reference; the citation of any document is not to be construed as an admission that it is prior art with respect to the present invention. To the extent that any definition or meaning of a term in this written document conflicts with any definition or meaning of the term in a document incorporated by reference, the definition or meaning assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Superabsorbent polymer particle comprising a precursor superabsorbent polymer particle comprising cross-linked poly(meth)acrylic acid and salts thereof, said precursor superabsorbent polymer particle comprising aliphatic C—H groups, and said precursor superabsorbent polymer particle having a surface and a core, and at least two different functionalizers covalently bonded to said surface of said precursor superabsorbent polymer particle, said functionalizers each comprising a functional unit and a grafting unit, said functional unit being covalently bonded to said grafting unit, said functionalizers differing with respect to their grafting unit, said functional unit having a molecular weight of up to 1000 and comprising chemical structures which are not present in said precursor superabsorbent polymer particle, said functional units adding an additional function to said precursor superabsorbent polymer particle or modifying an existing function of said precursor superabsorbent polymer particle, wherein said grafting unit of said functionalizer is covalently bonded to one of said aliphatic C—H groups comprised in said precursor superabsorbent polymer particle.

2. Superabsorbent polymer particle according to claim 1, wherein said functional unit comprises at least one heteroatom.

3. Superabsorbent polymer particle according to claim 1, wherein said aliphatic C—H group comprises a methylene- or a methyl-group.

4. Superabsorbent polymer particle according to claim 1, wherein said additional function or modified function is hydrophilicity, hydrophobicity, color or ion exchange capacity.

5. Superabsorbent polymer particle according to claim 1, wherein said additional function or modified function is an antibacterial and/or a fungicide function, or is a malodor-absorbing function.

6. Superabsorbent polymer particle according to claim 1, wherein said additional function or modified function is the ability to release ingredients upon contact of the functional unit with liquid, upon increasing the temperature of the functional unit, or by exerting pressure on the functional unit, said ingredients being enclosed in the functional unit before being released.

7. Superabsorbent polymer particle according to claim 1, wherein said additional function or modified function is the function of a wetness indicator.

8. Superabsorbent polymer particle according to claim 1, wherein said additional function or modified function is a temperature balancing function or a cooling function.

9. Superabsorbent polymer particle according to claim 1, wherein said additional function or modified function is the function of permanent tackiness.

10. An absorbent article comprising a substantially liquid pervious topsheet, a substantially liquid impervious backsheet and an absorbent core between said topsheet and said backsheet, wherein said absorbent article comprises superabsorbent polymer particles according to claim 1.

* * * * *

UNITED STATES PATENT AND TRADEMARK OFFICE
CERTIFICATE OF CORRECTION

PATENT NO.      : 7,655,830 B2                          Page 1 of 3
APPLICATION NO. : 11/198081
DATED           : February 2, 2010
INVENTOR(S)     : Andreas Flohr et al.

It is certified that error appears in the above-identified patent and that said Letters Patent is hereby corrected as shown below:

Column 4
Line 5, delete "waterinsoluble" and insert --water-insoluble--.
Column 5
Line 14, delete "polyfinctional" and insert --polyfunctional--.
Line 53, delete "posttreatment" and insert --post-treatment--.
Column 8
Formula 1, delete " 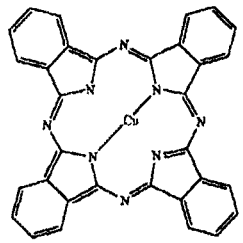 "

and insert

-- 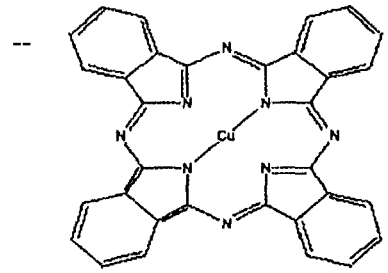 --.

The correct version appears at page 12, line 4 in the specification.

CERTIFICATE OF CORRECTION (continued)　　　　　　　　Page 2 of 3
U.S. Pat. No. 7,655,830 B2

Formula 2, delete

"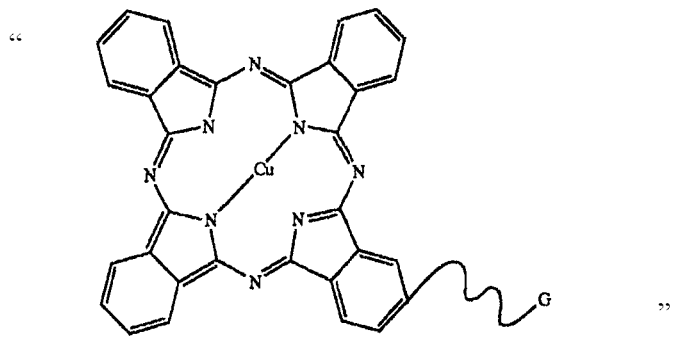"

and insert

--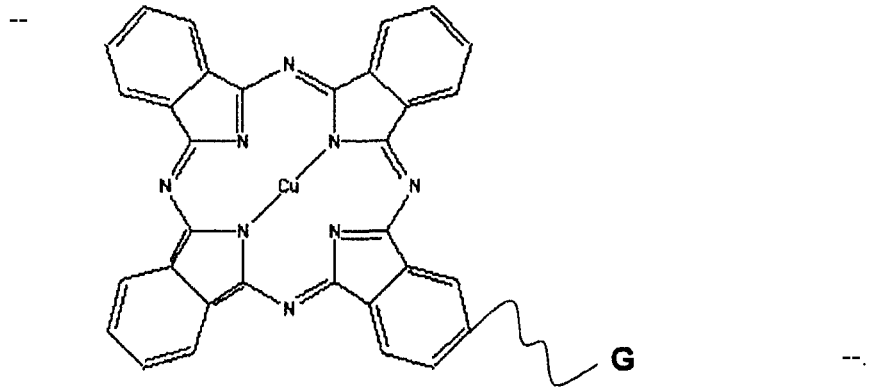--.

Formula 4, delete

"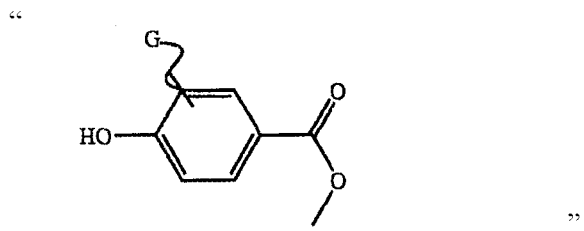"

CERTIFICATE OF CORRECTION (continued)
U.S. Pat. No. 7,655,830 B2 and insert

-- 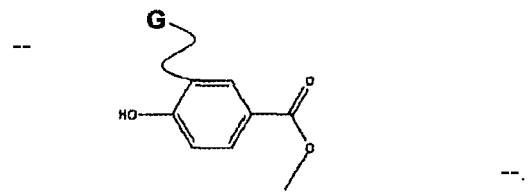 --.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,655,830 B2  Page 1 of 1
APPLICATION NO. : 11/198081
DATED : February 2, 2010
INVENTOR(S) : Flohr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Twenty-third Day of November, 2010

David J. Kappos
*Director of the United States Patent and Trademark Office*